(12) United States Patent
Jain et al.

(10) Patent No.: US 10,756,953 B1
(45) Date of Patent: Aug. 25, 2020

(54) METHOD AND SYSTEM OF SEAMLESSLY RECONFIGURING A DATA CENTER AFTER A FAILURE

(71) Applicant: Veritas Technologies LLC, Mountain View, CA (US)

(72) Inventors: Ankit Jain, Pune (IN); Sumeet Parmar, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 42 days.

(21) Appl. No.: 15/475,514

(22) Filed: Mar. 31, 2017

(51) Int. Cl.
*H04L 12/24* (2006.01)
*H04L 29/08* (2006.01)

(52) U.S. Cl.
CPC .......... *H04L 41/0668* (2013.01); *H04L 67/10* (2013.01)

(58) Field of Classification Search
CPC combination set(s) only.
See application file for complete search history.

(56) References Cited

U.S. PATENT DOCUMENTS

| | | | |
|---|---|---|---|
| 5,852,724 A | 12/1998 | Glenn, II et al. | |
| 7,213,246 B1 | 5/2007 | Van Rietschote et al. | |
| 7,543,174 B1 | 6/2009 | Van Rietschote et al. | |
| 7,668,962 B2 | 2/2010 | Tran et al. | |
| 8,713,376 B1 | 4/2014 | Makin et al. | |
| 8,825,792 B1* | 9/2014 | Niedzielski | H04L 69/40 709/217 |
| 9,454,444 B1 | 9/2016 | Agarwal et al. | |
| 2012/0221813 A1* | 8/2012 | Inoue | G06F 11/2064 711/162 |
| 2015/0143064 A1* | 5/2015 | Bhargava | G06F 11/1451 711/162 |
| 2016/0048408 A1* | 2/2016 | Madhu | G06F 11/1458 718/1 |
| 2016/0077919 A1* | 3/2016 | Duggan | G06F 11/1446 714/15 |
| 2016/0188689 A1* | 6/2016 | Singh | G06F 16/27 707/610 |
| 2017/0017411 A1* | 1/2017 | Choi | G06F 12/0246 |

* cited by examiner

*Primary Examiner* — Jamal Javaid
*Assistant Examiner* — Thad N Defauw
(74) *Attorney, Agent, or Firm* — Lowert Hood Munyon Rankin and Goetzel PC

(57) ABSTRACT

Systems, apparatuses, methods, and computer readable mediums for seamlessly reconfiguring a data center after a failure are disclosed. In one embodiment, a system includes at least a primary data center and a secondary data center. When a failure occurs at the primary data center, software executing on the secondary data center dynamically identifies the storage resources correlation that is setup for disaster recovery. The software executing on the secondary data center will automatically identify the resources correlation based on the replication properties of the storage configuration. The resources will then be configured with the new parameters when new hardware and software is added to the primary data center after the failure.

20 Claims, 7 Drawing Sheets

METHOD AND SYSTEM OF SEAMLESSLY RECONFIGURING A DATA CENTER AFTER A FAILURE

BACKGROUND

Technical Field

Embodiments described herein relate to disaster recovery and more particularly, to seamlessly reconfiguring a data center after a failure by dynamically identifying newly configured assets.

Description of the Related Art

Disaster recovery refers to the ability to restore operation of one or more software applications after a disaster has disrupted execution of the application(s). In order to facilitate recovery from a failure at a primary data center hosting the applications, a disaster recovery plan is implemented before the disaster occurs to prepare a secondary data center to be ready to takeover for the primary data center. In some cases, a failure such as a "smoking hole" scenario occurs on the primary data center in which recovery of any equipment or data from the particular site is either impossible or impractical. Additionally, other types of failures or disruptions can occur to a data center which negatively impact the applications running on the data center or other operations of the data center. As used herein, the term "failure" refers to any type of disruption in, or failure of, desired operation. In some cases, such a failure may be catastrophic in the sense that the software and/or hardware is not recoverable. In other cases, the failure may be less severe, but may nonetheless impair desired and/or efficient operations. When a failure occurs on the primary site, if disaster recovery is in place, the business critical applications should failover to the secondary site. On the primary site, the user will setup new hardware and software resources. However, bringing up the primary site again can be cumbersome and time-consuming.

SUMMARY

Systems, apparatuses, and methods for seamlessly reconfiguring a data center after a failure are disclosed. In one embodiment, a system includes a plurality of data centers and one or more networks coupling together the plurality of data centers. In one embodiment, the system includes at least a primary data center and a secondary data center. When a failure occurs at the primary data center, software executing on the secondary data center dynamically identifies the correlation between software resources based on the replication properties of the storage resources.

In one embodiment, the user is not required to perform any manual mapping of the older hardware and software assets to the newer assets after the older hardware is destroyed. Rather, a resiliency platform software application executing on the secondary data center will automatically identify the resources correlation based on the replication properties of the storage configuration. The resources will then be configured with the new parameters when new hardware and software are added to the primary data center after the failure.

In one embodiment, a graphical user interface (GUI) of the resiliency platform software application will provide a new check-box in the edit section of the assets configuration page. If the user selects the check-box, then the resiliency platform software application determines that the context of the edit section is for the purpose of setting up the newly configured assets. Enabling this option will automatically enable the resiliency platform software application to retrieve the mapping of the old and the new asset configuration that is stored in a replicated database. For example, in one embodiment, the resiliency platform software application will identify all of the virtual machines (VMs) associated with the old hardware and then the same set of VMs are recreated on the new hardware based on the retrieved mapping information. The mapping information is stored as part of the disaster recovery software. Generally speaking, as new hardware and software are added in the primary data center, the resiliency platform software application has the ability to recover itself and become operable again on the primary data center. Then, the resiliency platform software application, running on the primary data center, will discover the replication storage properties of the new hardware and software. The discovered replication storage properties are then used to recreate software resources on the new hardware.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
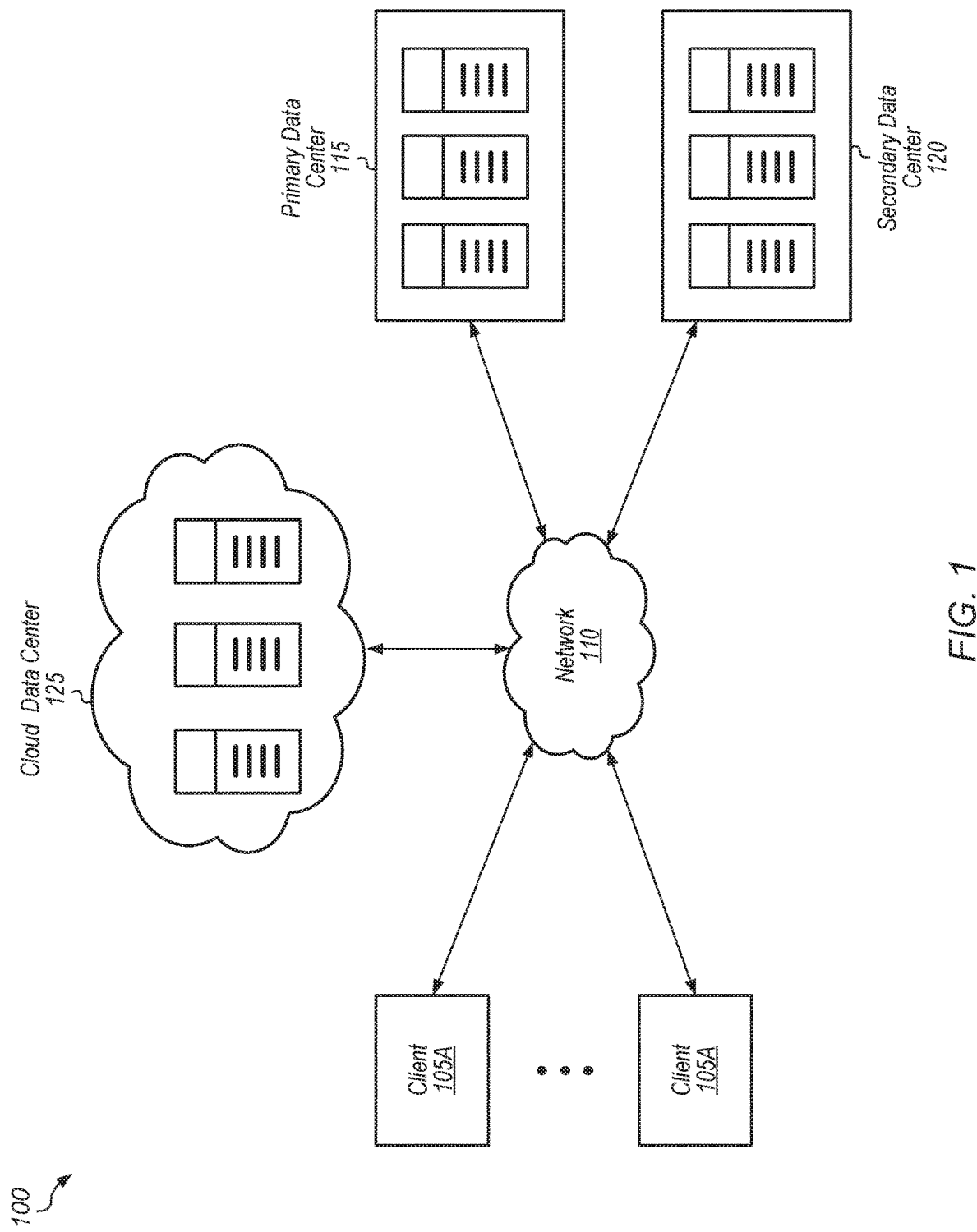
FIG. 1 is a block diagram of one embodiment of a system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a data center . . . ." Such a claim does not foreclose the system from including additional components (e.g., a processor, a display unit, a memory).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram of one embodiment of a system 100 is shown. System 100 includes clients 105A-N, network 110, primary data center 115, secondary data center 120, and cloud data center 125. Primary data center 115, secondary data center 120, and cloud data center 125 are representative of any number and type of data centers which may be included within system 100. In one embodiment, primary data center 115 and secondary data center 120 are at different geographical locations. Primary data center 115 and secondary data center 120 may include any number and type of physical machines, such as computers and/or servers (e.g., database server, file server, application server), and any number and type of storage devices. The physical machines of primary data center 115 and secondary data center 120 include any number and type of processors for executing instructions to carry out the methods and mechanisms described herein. Primary data center 115 and secondary data center 120 may include any number of hosts, virtual machines (VMs), databases, applications, and agents. Cloud data center 125 also can include any number of hosts, virtual machines (VMs), databases, applications, and agents. It is noted that system 100 may include other components and/or the components may be arranged differently in other embodiments.

As used herein, the term "host" may be defined as a virtual machine, physical machine, operating system, application, or the like. Additionally, as used herein, the term "virtual machine" generally refers to a computing system platform that may not have direct correspondence to hardware of an underlying physical machine. For example, hardware of a physical machine may be abstracted to a virtual machine using a hypervisor or other virtualization software. A virtual machine may run a guest operating system and/or various other software applications.

In one embodiment, primary data center 115 is utilized as the main data center for hosting applications and other software for a company or organization. Secondary data center 120 is utilized as a failover site for hosting the same applications and other software for the company. In some embodiments, cloud data center 125 is utilized as the failover site for hosting various applications and other software. Cloud data center 125 is configured to offer cloud computing resources to the organization or company utilizing system 100. Cloud computing is the delivery of computing as a service where shared resources, software, and information are provided to computers and other devices over a network. Cloud computing provides computation, software, data access, and data storage services. Many cloud computing infrastructures consist of services delivered through shared data centers and appear as a single point of access. Cloud data center 125 may include a plurality of servers, including dynamically scalable or virtualized servers. In some embodiments, system 100 may include cloud data center 125 as a single failover site and secondary data center 120 may not be included within system 100 in these embodiments.

Network 110 may be any type of network or combination of networks, including wireless connection, direct local area network (LAN), metropolitan area network (MAN), wide area network (WAN), a Public Switched Telephone Network (PSTN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. Network 110 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 110.

Clients 105A-N are representative of any number of stationary or mobile computers such as desktop personal computers (PCs), servers, server farms, workstations, laptops, handheld computers, servers, personal digital assistants (PDAs), smart phones, tablets, wearable devices, and so forth. Generally speaking, clients 105A-N include one or more processors comprising one or more processor cores. Each processor core includes circuitry for executing instructions according to an instruction set architecture. The processor cores can access cache memory subsystems for data and computer program instructions. The cache subsystems can be coupled to a memory hierarchy comprising random access memory (RAM) and a storage device.

In one embodiment, one or more software applications and datastores are hosted on the physical machines of primary data center 115. As used herein, the term "datastore" is defined as a repository for storing and managing a collection of data. In one embodiment, the term "datastore" is defined as a file that stores a virtual machine. In one embodiment, a datastore may be identified using a logical unit number (LUN). The applications and datastores are replicated from primary data center 115 to secondary data center 120 or cloud data center 125. A resiliency platform application stores mappings of software components to an existing datastore and an indication of a first replication link between the existing datastore and a replicated datastore on secondary data center 120 or cloud data center 125. In one embodiment, the resiliency platform application utilizes a relational database with tables or graphs with edges that allow links between replicated datastores to be identified.

When a failure occurs at primary data center 115, the applications failover to secondary data center 120 or cloud data center 125. When a user adds new hardware and a new datastore at primary data center 115 after the failure, the resiliency platform application detects the new hardware and a new datastore on the new hardware. Still further, the resiliency platform application also detects a second replication link between the new datastore and the replicated datastore on secondary data center 120 or cloud data center 125. In response to detecting the second replication link, the resiliency platform application retrieves the stored indication of the first replication link and the stored mappings of the previous software components to the previous datastore. The resiliency platform application utilizes the retrieved mappings and the indication of the second replication link to create and map new software components to the new datastore. Then, after the new software components have been mapped to the new datastore, the resiliency platform application orchestrates the failback of the applications to the new datastore on primary data center 115.

Figure 2:
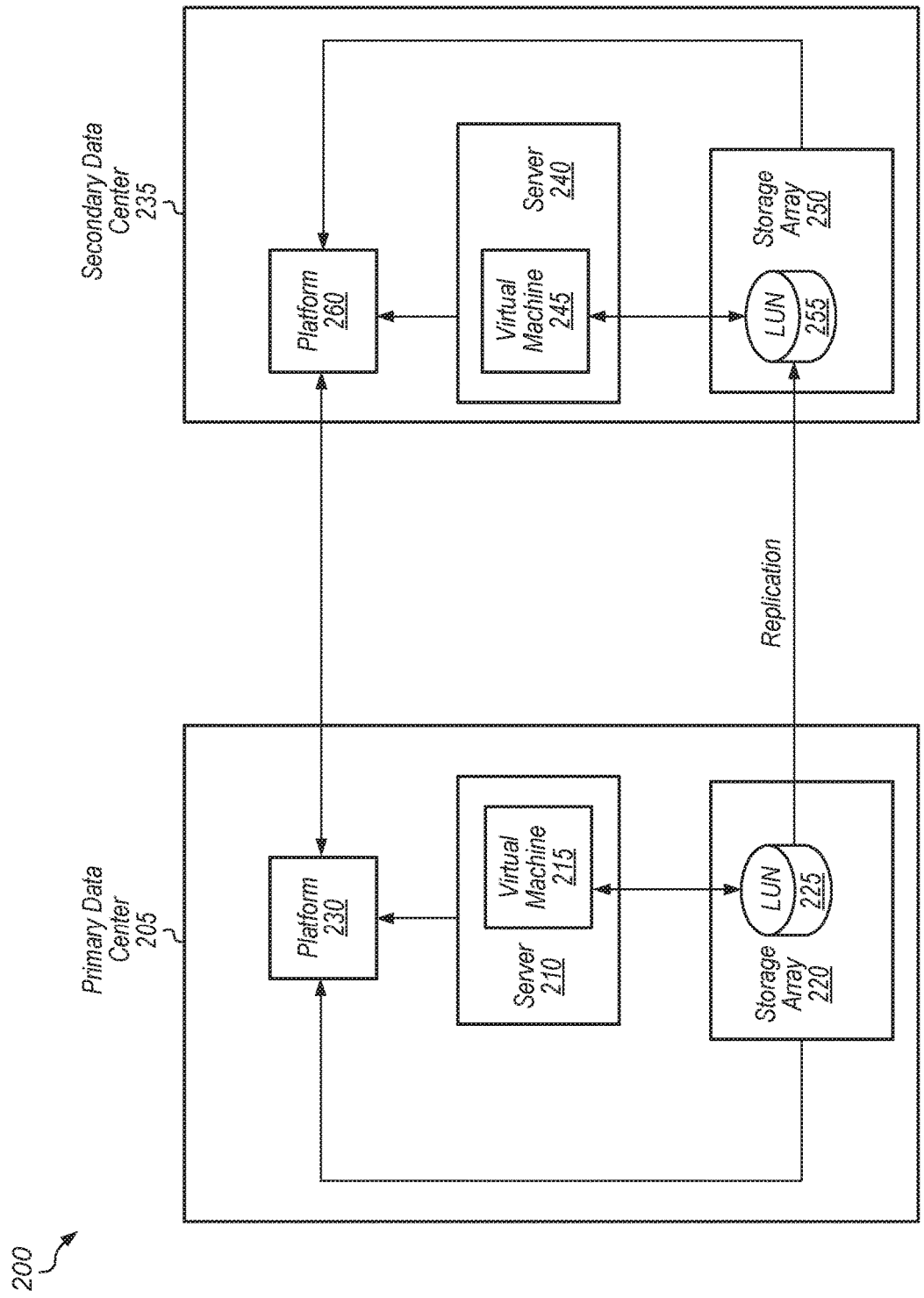
FIG. 2 is a block diagram of another embodiment of a system.

Turning now to FIG. 2, a block diagram of another embodiment of a system 200 is shown. System 200 includes primary data center 205 and secondary data center 235. Primary data center 205 may be connected to secondary data center 235 via a network (not shown), with any type and number of networks providing the connection. Secondary data center 235 is representative of any type of secondary data center which is used by primary data center 205 as the target data center for disaster recovery operations. For example, in one embodiment, secondary data center 235 is a cloud-based data center. It is noted that system 200 may include any number of other data centers.

Primary data center 205 includes platform 230, server 210, and storage array 220. Storage array 220 is representative of any type of storage system or collection of storage devices utilized by server 210 for storing data. Primary data center 205 may also include any number of other components which are not shown in FIG. 2 to avoid obscuring the figure. Virtual machine (VM) 215 executes on server 210, and VM 215 is representative of any number and type of VMs or other software components (e.g., applications) executing on server 210. Storage array 220 includes logical unit number (LUN) 225, and LUN 225 is representative of any number of LUNs. It is assumed for the purposes of this discussion that LUN 225 is being replicated to LUN 255 of secondary data center 235.

In one embodiment, platform 230 is a software application which provides a resiliency platform for system 200 to manage data and applications during disaster recovery operations. The resiliency platform generates a GUI to allow a user or administrator to manage disaster recovery plans for the various software applications, volumes, hosts, virtual machines, and the like which are present in system 200. In various embodiments, the user adds assets (e.g., storage, hosts, virtualization servers) to primary data center 205 and determines the connections between the assets. The resiliency platform 230 maintains mappings of the connections between the different assets. In one embodiment, platform 230 generates and stores a mapping of the replication link between LUN 225 and LUN 255. As used herein, the term "mapping" is defined as an indication or recording of a connection between two or more elements. In one embodiment, the term "mapping" refers to an entry stored in a mapping table. Platform 230 also generates and stores mappings of VM 215 to LUN 225 of server 210. If a failure occurs at a later point in time, platform 230 may use these stored mappings to recreate new workflows for new hardware that is added to primary data center 205 after the failure. The new workflows are created to match previous workflows for software components which were disrupted by the failure. Alternatively, rather than creating new workflows, platform 230 may update the existing workflows to reference the new software components.

Secondary data center 235 includes platform 260, server 240, and storage array 250. Secondary data center 235 may also include any number of other components which are not shown in FIG. 2 to avoid obscuring the figure. Platform 230 is configured to communicate with platform 260 over the network. In one embodiment, platform 230 is configured to replicate mapping tables, workflows, resiliency groups and other data to a replicated database on secondary data center 235, with platform 260 sharing the replicated database with platform 230. If a failure occurs on primary data center 205, VM 215 will failover to VM 245 on secondary data center 235.

In another embodiment, a failure may occur at the secondary data center 235. This failure may not impact the user applications running on primary data center 205, but eventually the user will want to reconfigure secondary data center 235 in case any disruption occurs at the primary data center 205. After the failure occurs at secondary data center 235, the user will typically setup/configure new assets at secondary data center 235. In various embodiments, the platform 260 is configured to automatically update the workflows to accommodate the new assets (e.g., server, array, hypervisor) without any input from the user. Accordingly, after platform 260 updates the workflows, the updated workflows will be available to enable failover or migration to the newly reconstructed secondary data center 235.

In one embodiment, a failure may occur for a portion or the entirety of storage array 220. For example, storage media (e.g., disks, flash, etc.) of storage array 220 may fail and not be recoverable while server 210 (e.g., including a hypervisor) remains fully functional. In this case, the user will add new storage media to storage array 220 or replace storage array 220 with a new storage array. Then, the user will reconfigure replication from secondary data center 235 to primary data center 205 and create new LUNs on primary data center 205, which will in turn lead to the creation of new LUN IDs on the primary. The new LUNs will be made visible to the hypervisor to enable failback. In this scenario, platform 230 is configured to identify the new LUNs and update the workflows to enable failback to occur.

Figure 3:
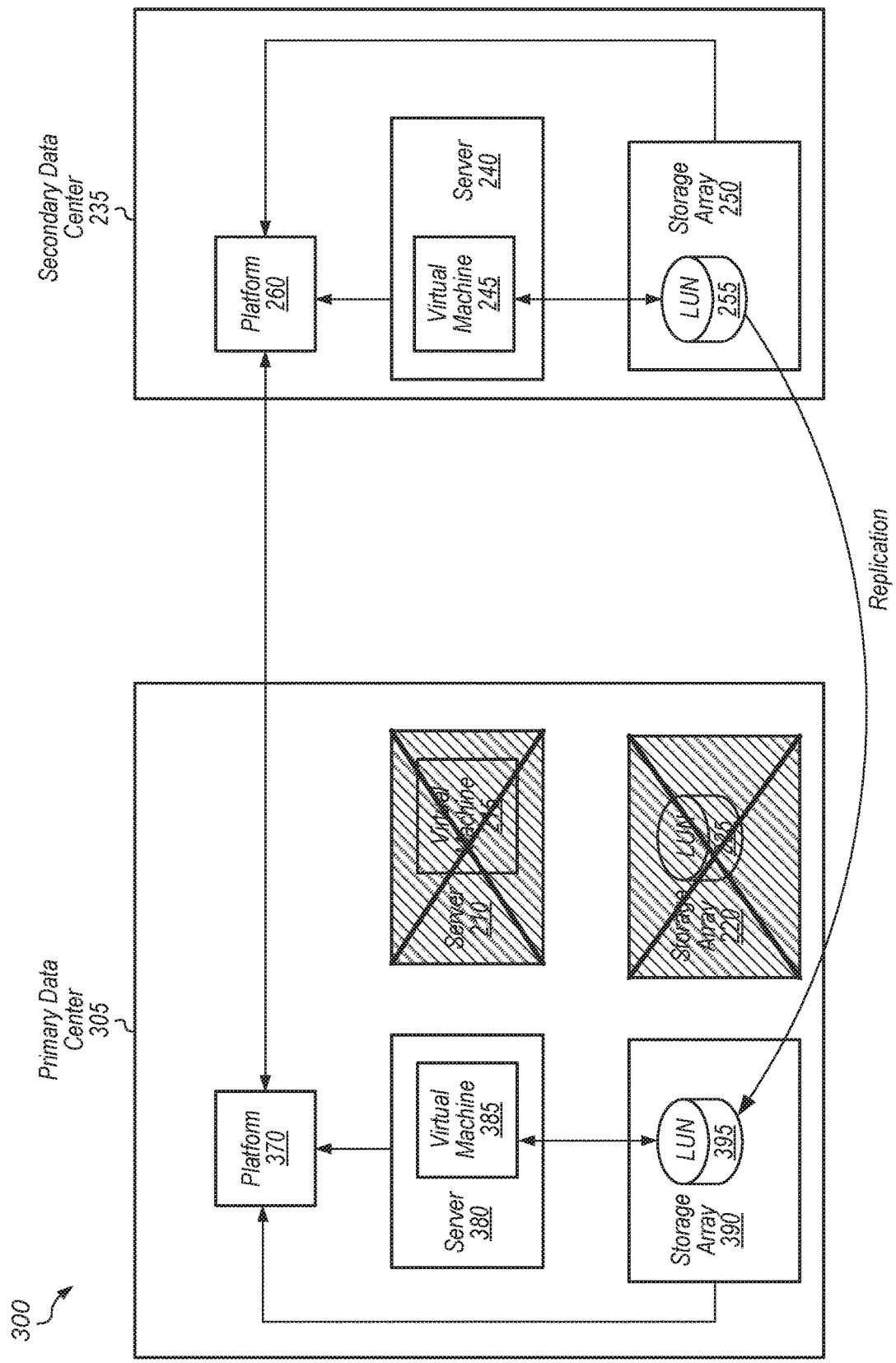
FIG. 3 is a block diagram of another embodiment of a system.

Referring now to FIG. 3, a block diagram of another embodiment of a system 300 is shown. System 300 is intended to represent system 200 (of FIG. 2) at a later point in time after a failure has occurred. Additionally, primary data center 305 is intended to represent primary data center 205 (of FIG. 2) after the failure has occurred and after a user has added a new server 380 and a new storage array 390 to primary data center 305. It is assumed for the purposes of this discussion that the user has configured storage array 390 with LUN 395 and connected LUN 395 to LUN 255 to start replication from LUN 255 to LUN 395. It is also assumed that the user has made LUN 395 visible to and accessible by server 390.

The X's drawn through server 210 and storage array 220 of primary data center 305 are intended to indicate that these components are no longer functioning as a result of the failure. It should be understood that a failure may affect any number of hardware components, and server 210 and storage array 220 are intended to represent any number and type of servers and storage arrays, respectively, which have been damaged or destroyed.

In one embodiment, the user selects an option in the user interface of platform 370 to notify platform 370 that a failure has occurred and that platform 370 should update the workflows associated with the old LUN 225. Accordingly, in one embodiment, in response to detecting the indication of the failure, platform 370 retrieves a stored indication of the previous replication link from LUN 225 to LUN 255. Also, platform 370 retrieves stored mappings of various software components (e.g., VM 215) to LUN 225. Additionally, platform 370 detects the new replication link between LUN 255 and LUN 395. Then, platform 370 identifies which software components were associated with the old server 210 and then recreates these software components on the new server 380 based on the saved configuration. Also, platform 370 updates the workflows and/or resiliency groups that reference the various software components which were previously mapped to LUN 225. For example, platform 370 updates the workflows and/or resiliency groups by replacing parameters of the previous software components (e.g., VM 215) with parameters of the new software components (e.g., VM 385) that now reside on LUN 395. After platform 370 updates the workflows and/or resiliency groups to reference the new software components (e.g., VM 385), the user can perform various actions (e.g., migrations, failovers, rehearsals) with these updated workflows and/or resiliency groups.

Figure 4:
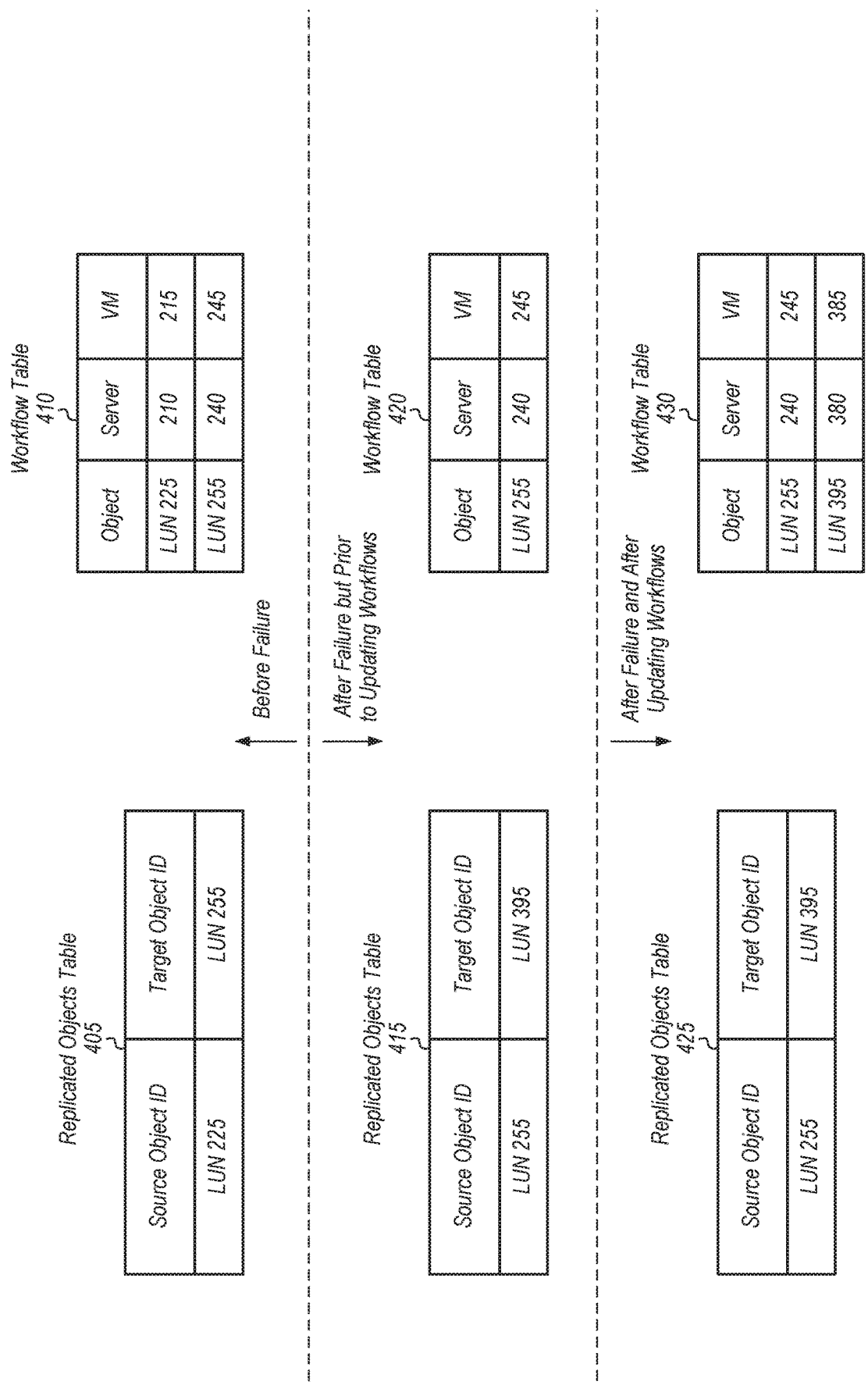
FIG. 4 illustrates mapping tables utilized by a resiliency platform in accordance with one or more embodiments.

Turning now to FIG. 4, one embodiment of mapping tables utilized by a resiliency platform software application are shown. The tables 405 and 410 are shown in the upper-third of FIG. 4, and tables 405 and 410 are generated and stored by a resiliency platform software application prior to a failure. Accordingly, mapping tables 405 and 410 correspond to the configuration of system 200 of FIG. 2. In system 200, LUN 225 was being replicated to LUN 255 as indicated by the mapping in table 405. Platform 230 is configured to detect this replication link and store this mapping in table 405. Table 405 may also be referred to as replicated objects table 405, with table 405 including entries for any type of object (e.g., LUN, host disk) that can be replicated. In other embodiments, replicated objects table 405 may be a graph or other type of structure for storing a representation of the replication link between two objects.

In system 200, VM 215 on server 210 is mapped to LUN 225 and VM 245 on server 240 is mapped to LUN 255. Platform 230 is configured to detect these connections and store the corresponding mappings in table 410, which may also be referred to as workflow table 410. The replicated objects tables 415 and workflow table 420 shown in the middle-third of FIG. 4 correspond to system 300 (of FIG. 3) after the failure has occurred but prior to the workflows being updated. Then, replicated objects table 425 and workflow table 430 are shown in the bottom-third to represent system 300 after the workflows have been updated as a result of the failure. After the failure, the user establishes the replication link between LUN 255 on secondary data center 235 and the new LUN 395. Platform 370 is configured to detect this replication link and store an indication of the replication link in table 425. Also, the connection between VM 385 on server 380 and LUN 395 is discovered by platform 370 and the mapping for this connection is stored in workflow table 430.

When platform 370 detects a request to update workflows in response to the failure, platform 370 utilizes the tables 425 and 430 to update the old parameters in the workflows with the new parameters associated with the new LUN 395 and VM 385 of server 380. Platform 370 utilizes tables 425 and 430 to automatically configure the workflow to failback on the new hardware. Table 425 provides the last link of the replicated object (LUN 255) from the secondary site, enabling the platform to use the link and the details of newly configured assets (at the primary site) to get the workflow updated and enable failback. Accordingly, platform 370 is configured to automatically update workflows and/or resiliency groups associated with the old LUN 225 and replace the old parameters with the new parameters associated with the new LUN 395. In one embodiment, tables 405-430 are stored in a replicated database utilized by the resiliency platform applications executing on the primary and secondary data centers.

Figure 5:
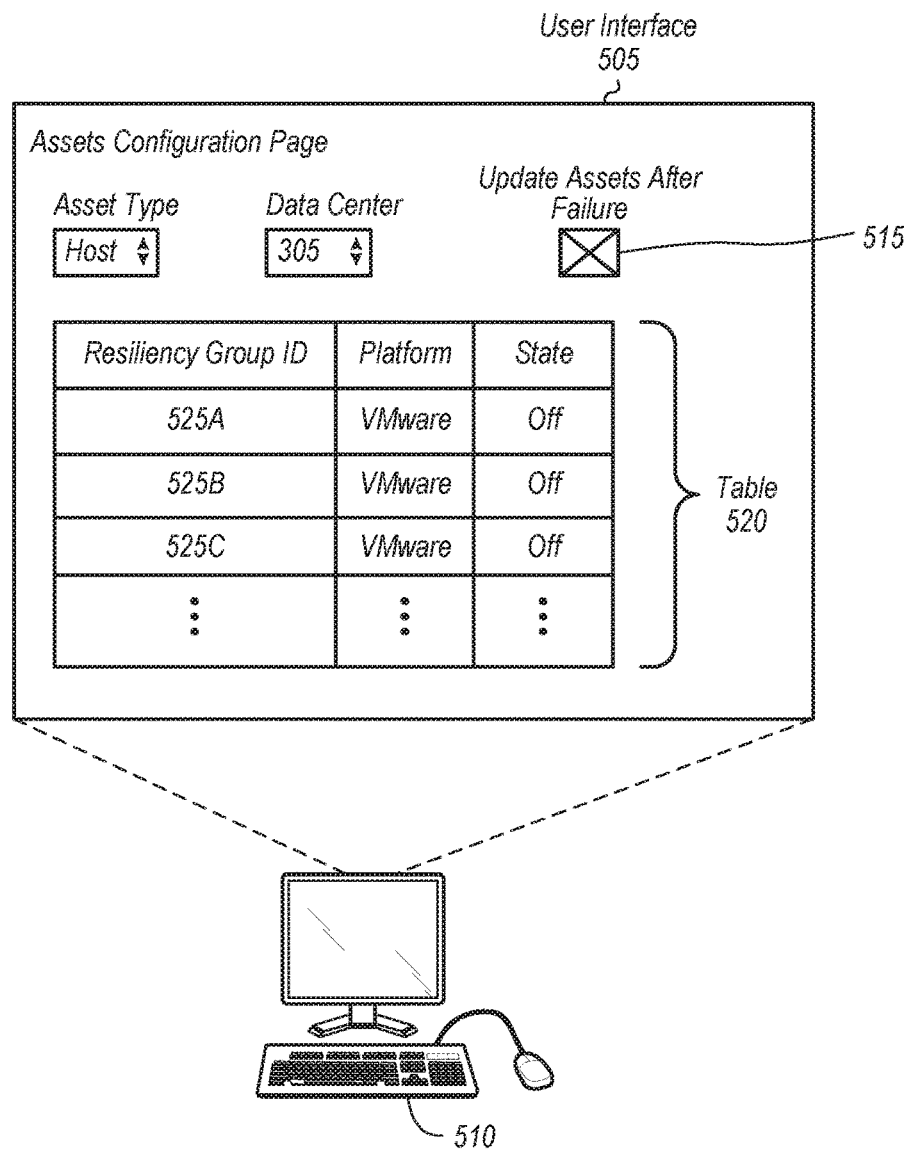
FIG. 5 is a diagram of one embodiment of a user interface for setting up newly configured assets in response to a failure.

Referring now to FIG. 5, a diagram of one embodiment of a user interface 505 for setting up newly configured assets in response to a failure is shown. In one embodiment, user interface 505 is generated by a resiliency platform application executing on computer system 510. Computer system 510 is representative of any type of computer system which includes one or more processors coupled to one or more memory devices, a display, one or more input devices, and/or other components.

Within user interface 505, the different assets which have been discovered by the resiliency platform application are displayed in table 520. In one embodiment, each entry of table 520 includes the resiliency group ID, platform, and state of the resiliency group. In other embodiments, each entry of table 520 may include one or more other fields. Additionally, in other embodiments, the entries of table 520 may correspond to VMs, applications, servers, hosts, LUNs, replication objects, or other types of assets. It is noted that user interface 505 is merely one example of a user interface that may be implemented in one embodiment. It should be understood that in other embodiments, user interface 505 may be organized differently and/or other information may be displayed in user interface 505 for the discovered assets.

If the user selects the "update assets after failure" option 515 in user interface 505, then the resiliency platform application will automatically set up the newly configured assets of the selected data center (e.g., data center 305). When option 515 is selected, the resiliency platform application will automatically perform the mapping of replicated assets to new assets based on the mappings stored in its replicated database. For example, the resiliency platform application will identify all of the resiliency groups 525A-C associated with the older server(s) and then the resiliency platform application will update these resiliency groups 525A-C with the newly created applications or VMs on the new server(s). The resiliency platform application will also identify which data stores are to be consumed on the new hardware for the new applications or VMs of resiliency groups 525A-C. Once the applications or VMs are created on the new hardware, new Host IDs are reported to the replicated database and used for the failback to the primary data center.

Figure 6:
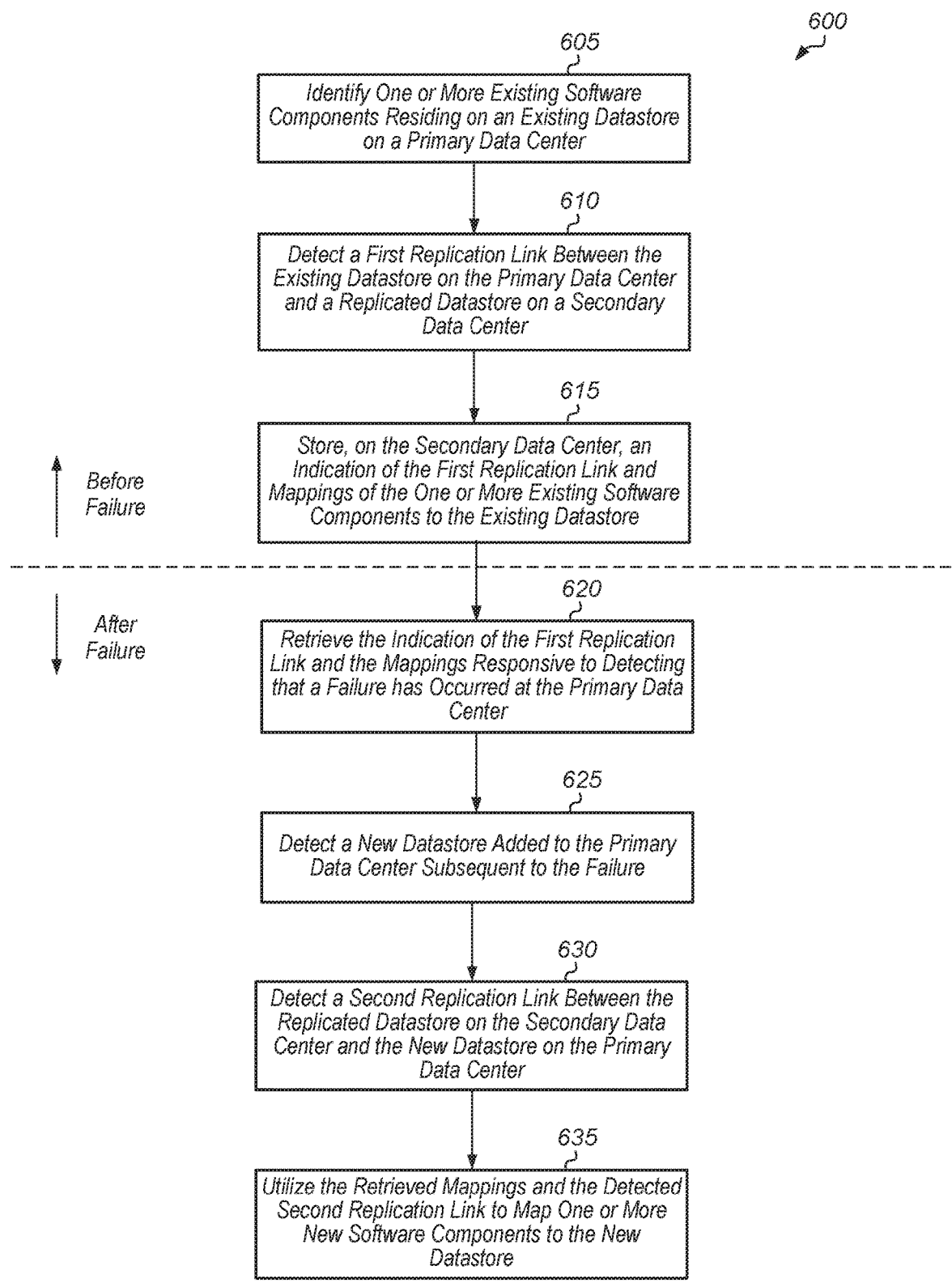
FIG. 6 is a generalized flow diagram illustrating one embodiment of a method for automatically reconfiguring a data center after a failure.

Turning now to FIG. 6, one embodiment of a method 600 for automatically reconfiguring a data center after a failure is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various apparatuses or systems described herein may be configured to implement method 600.

A software application identifies one or more existing software components residing on an existing datastore on a primary data center (block 605). In one embodiment, the software application is a resiliency platform application. Also, the software application detects a first replication link between the existing datastore on the primary data center and a replicated datastore on a secondary data center (block 610).

Additionally, the software application stores, on the secondary data center, an indication of the first replication link and mappings of the one or more existing software components to the existing datastore (block 615). Next, the software application retrieves the indication of the first replication link and the mappings responsive to detecting that a failure has occurred at the primary data center (block 620). Also, the software application detects a new datastore added to the primary data center subsequent to the failure (block 625). Additionally, the software application detects a second replication link between the replicated datastore on the secondary data center and the new datastore on the primary data center (block 630). In one embodiment, the replicated objects table is updated based on the second replication link between the replicated datastore and the new datastore. In one embodiment, using the updated information in this table, the software application may update one or more workflows. Next, the software application utilizes the retrieved mappings and the detected second replication link to map one or more new software components to the new datastore (block 635). After block 635, method 600 ends.

Figure 7:
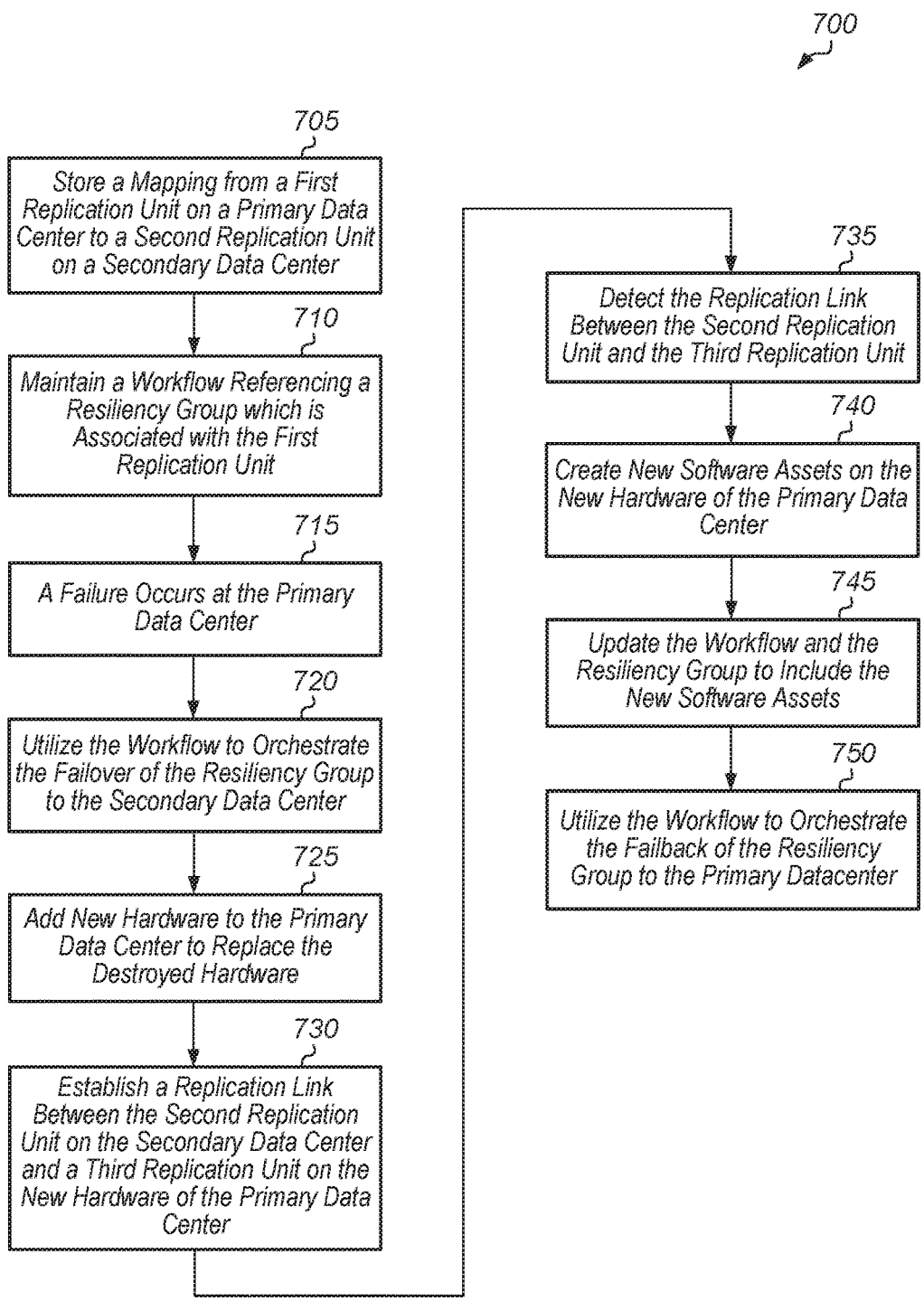
FIG. 7 is a generalized flow diagram illustrating another embodiment of a method for automatically reconfiguring a data center after a failure.

Referring now to FIG. 7, another embodiment of a method 700 for automatically reconfiguring a data center after a failure is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various apparatuses or systems described herein may be configured to implement method 700.

A resiliency platform application stores a mapping from a first replication unit on a primary data center to a second replication unit on a secondary data center (block 705). In one embodiment, the first replication unit and the second replication unit are identified using logical unit numbers (LUNs). As used herein, the term "replication unit" is defined as a logical entity which is being replicated between data centers. The logical entity may include any amount of data. Examples of replication units include, but are not limited to, datastores and volumes.

It is assumed for the purposes of this discussion that the first replication unit is being replicated to the secondary data center. Also, the resiliency platform application maintains a workflow referencing a resiliency group which is associated with the first replication unit (block 710). As used herein, the term "resiliency group" is defined as a collection of software resources (e.g., applications, virtual machines) which are managed and monitored as a single entity. As used herein, the term "workflow" is defined as a script or plan for performing a sequential execution of one or more predefined steps associated with a resiliency group. In one embodiment, the user creates a resiliency group and adds the software resources to the resiliency group via a user interface generated by the resiliency platform application. The user may also add the resiliency group to one or more workflows.

Next, a failure occurs at the primary data center (block 715). It is assumed for the purposes of this discussion that one or more hardware assets on the primary data center have been destroyed or otherwise rendered unusable. In response to the failure occurring, the resiliency platform application is configured to utilize the workflow to orchestrate the failover of the resiliency group to the secondary data center (block 720). As used herein, the term "failover" is defined as transferring operations of the software components of the resiliency group from the primary data center to the secondary data center.

Then, at a later point in time, a user or administrator adds new hardware (e.g., servers, storage arrays) to the primary data center to replace the destroyed hardware (block 725). The user also establishes a replication link between the second replication unit on the secondary data center and a third replication unit on the new hardware (block 730).

Next, the resiliency platform detects the replication link between the third LUN and the second LUN (block 735). Also, the resiliency platform creates new software assets on the new hardware of the primary data center (block 740). Then, the resiliency platform updates the workflow and the resiliency group to include the new software assets (block 745). Next, the workflow is utilized by the resiliency platform to orchestrate the failback of the resiliency group to the primary datacenter (block 750). As used herein, the term "failback" is defined as the process of restoring software components to the primary data center after the software components have been shifted to the secondary data center during failover. After block 750, method 700 ends.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:
1. A system comprising:
a primary data center; and
a secondary data center coupled to the primary data center via a network;
wherein the system is configured to:
detect a first replication link between a first replication unit on the primary data center and a second replication unit on the secondary data center;

utilize a workflow to orchestrate a failover of a resiliency group to the second replication unit on the secondary data center in response to a failure at the primary data center;

detect a second replication link between the second replication unit on the secondary data center and a third replication unit on the primary data center subsequent to the failover;

in response to detecting the second replication link:
utilize the second replication link to update the workflow; and
utilize the workflow to orchestrate a failback of the resiliency group to the third replication unit on the primary datacenter.

2. The system as recited in claim 1, wherein the system is configured to utilize the second replication link to automatically map one or more new software components to the third replication unit.

3. The system as recited in claim 1, wherein the system is further configured to:
generate a user interface to display an asset configuration page for the primary data center; and
display an option in the asset configuration page to enable a user to update assets after the failure.

4. The system as recited in claim 1, wherein one or more new software components mapped to the third replication unit comprise one or more virtual machines (VMs).

5. The system as recited in claim 2, wherein the system is further configured to:
store, in a replicated objects table, an indication of the second replication link between the second replication unit on the secondary data center and the third replication unit on the primary data center.

6. The system as recited in claim 3, wherein responsive to the user selecting the option to update assets after the failure, the system is configured to
update the resiliency group to reference one or more new software components on new servers of the primary data center.

7. The system as recited in claim 5, wherein the system is configured to
retrieve, from the replicated objects table, the indication of the second replication link responsive to detecting the failure at the primary data center.

8. A method comprising:
detecting a first replication link between a first replication unit on the primary data center and a second replication unit on the secondary data center;
utilizing a workflow to orchestrate a failover of a resiliency group to the second replication unit on the secondary data center in response to a failure at the primary data center;
detecting a second replication link between the second replication unit on the secondary data center and a third replication unit on the primary data center subsequent to the failover;
in response to detecting the second replication link:
utilizing the second replication link to update the workflow; and
utilizing the workflow to orchestrate a failback of the resiliency group to the third replication unit on the primary datacenter.

9. The method as recited in claim 8, further comprising utilizing the second replication link to automatically map one or more new software components to the third replication unit.

10. The method as recited in claim 8, further comprising:
generating a user interface to display an asset configuration page for the primary data center; and
displaying an option in the asset configuration page to enable a user to update assets after the failure.

11. The method as recited in claim 8, wherein one or more new software components mapped to the third replication unit comprise one or more virtual machines (VMs).

12. The method as recited in claim 9, further comprising:
storing, in a replicated objects table, an indication of the second replication link between the second replication unit on the secondary data center and the third replication unit on the primary data center.

13. The method as recited in claim 10, wherein responsive to the user selecting the option to update assets after the failure, the method further comprising
updating the resiliency group to reference one or more new software components on new servers of the primary data center.

14. The method as recited in claim 12, further comprising retrieving, from the replicated objects table, the indication of the second replication link responsive to detecting the failure at the primary data center.

15. A non-transitory computer readable storage medium storing program instructions, wherein the program instructions are executable by a processor to:
detect a first replication link between a first replication unit on the primary data center and a second replication unit on the secondary data center;
utilize a workflow to orchestrate a failover of a resiliency group to the second replication unit on the secondary data center in response to a failure at the primary data center;
detect a second replication link between the second replication unit on the secondary data center and a third replication unit on the primary data center subsequent to the failover;
in response to detecting the second replication link:
utilize the second replication link to update the workflow; and
utilize the workflow to orchestrate a failback of the resiliency group to the third replication unit on the primary datacenter.

16. The non-transitory computer readable storage medium as recited in claim 15, wherein the program instructions are further executable by a processor to utilize the second replication link to automatically map one or more new software components to the third replication unit.

17. The non-transitory computer readable storage medium as recited in claim 15, wherein the program instructions are further executable by a processor to:
generate a user interface to display an asset configuration page for the primary data center; and
display an option in the asset configuration page to enable a user to update assets after the failure.

18. The non-transitory computer readable storage medium as recited in claim 16, wherein the program instructions are further executable by a processor to:
store, in a replicated objects table, an indication of the second replication link between the second replication unit on the secondary data center and the third replication unit on the primary data center.

19. The non-transitory computer readable storage medium as recited in claim 17, wherein responsive to the user selecting the option to update assets after the failure, the program instructions are further executable by a processor to:

update the resiliency group to reference one or more new software components on new servers of the primary data center.

20. The non-transitory computer readable storage medium as recited in claim 18, wherein the program instructions are further executable by a processor to
retrieve, from the replicated objects table, the indication of the second replication link responsive to detecting the failure at the primary data center.

* * * * *